(12) United States Patent
Spiegel

(10) Patent No.: US 9,658,323 B2
(45) Date of Patent: May 23, 2017

(54) METHOD FOR MEASURING A TRANSMISSION PATH BY MEANS OF COMPENSATING AMPLITUDE MEASUREMENT AND DELTA-SIGMA METHOD, AND DEVICE FOR IMPLEMENTING THE METHOD

(71) Applicant: ELMOS SEMICONDUCTOR AG, Dortmund (DE)

(72) Inventor: Egbert Spiegel, Gelsenkirchen (DE)

(73) Assignee: Elmos Semiconductor AG, Dortmund (DE)

(*) Notice: Subject to any disclaimer, the term of this patent is extended or adjusted under 35 U.S.C. 154(b) by 451 days.

(21) Appl. No.: 14/296,096

(22) Filed: Jun. 4, 2014

(65) Prior Publication Data
US 2016/0146928 A1 May 26, 2016

Related U.S. Application Data

(63) Continuation of application No. PCT/EP2012/072092, filed on Nov. 8, 2012.

(30) Foreign Application Priority Data
Dec. 6, 2011 (EP) .................................. 11192161

(51) Int. Cl.
*G01S 7/486* (2006.01)
*G01S 7/497* (2006.01)
(Continued)

(52) U.S. Cl.
CPC ............. *G01S 7/497* (2013.01); *G01S 7/486* (2013.01); *G01S 17/026* (2013.01); *G01S 17/936* (2013.01); *G01S 7/526* (2013.01)

(58) Field of Classification Search
CPC ...................................................... G01S 7/486
(Continued)

(56) References Cited

U.S. PATENT DOCUMENTS 4,879,508 A * 11/1989 Andermo ............... G01B 7/003
324/660
5,666,037 A 9/1997 Reime
(Continued)

FOREIGN PATENT DOCUMENTS

DE 9309837.5 U1 9/1993
DE 198 39 730 C1 3/2000
(Continued)

*Primary Examiner* — Bryan Bui
(74) *Attorney, Agent, or Firm* — Bose McKinney & Evans LLP (57) ABSTRACT

A method for measuring transmission characteristics of a transmission path between a transmitter and a receiver. A first transmitter sends a first signal into a first transmission path. The first signal is detected by the receiver. A second transmitter sends a second signal into a second transmission path having known characteristics or characteristics that can be predetermined. The second signal is superimposed with the first signal. A transmission signal is intermittently distributed between the first and second transmitters in a controlled manner. The signal received by the receiver comprises first and second signal components to be assigned to the first and second transmitters, respectively. The first signal component averaged over a predefined time period essentially is exactly as large as the averaged second signal component and the deviation between the averaged signal components is at least intermittently used as control signal for the switching between the first and second transmitters.

19 Claims, 6 Drawing Sheets

(51) Int. Cl.
   *G01S 17/02*    (2006.01)
   *G01S 17/93*    (2006.01)
   *G01S 7/526*    (2006.01)
(58) Field of Classification Search
   USPC .......................................................... 702/124
   See application file for complete search history.

(56)              References Cited

U.S. PATENT DOCUMENTS 6,384,379  B1   5/2002  Reime
   7,589,303  B2   9/2009  Reime et al.
   8,405,821  B2   3/2013  Reime
   2003/0001756  A1   1/2003  Reime
   2003/0020004  A1   1/2003  Reime
   2003/0155487  A1   8/2003  Reime
   2007/0221824  A1   9/2007  Melcher et al.
   2010/0182588  A1   7/2010  Reime

FOREIGN PATENT DOCUMENTS

DE          10 001 943  A1    7/2001
   DE          10 001 955  A1    7/2001
   DE          10 024 156  A1   11/2001
   DE          10 346 741  B3    3/2005
   DE       10 2004 025 345  B3   11/2005
   DE       10 2005 010 745  B3    4/2006
   DE       10 2005 013 352  A1   10/2006
   DE       10 2007 005 187  A1    9/2008
   DE       10 2007 005 187  B4   11/2008
   EP           2 159 600  A1    3/2010

\* cited by examiner

METHOD FOR MEASURING A TRANSMISSION PATH BY MEANS OF COMPENSATING AMPLITUDE MEASUREMENT AND DELTA-SIGMA METHOD, AND DEVICE FOR IMPLEMENTING THE METHOD

RELATED APPLICATIONS

This application is a continuation of PCT/EP2012/072092, filed Nov. 8, 2012, which claims priority to EP 11192161.5, filed Dec. 6, 2011, both of which are hereby incorporated herein by reference in their entireties.

BACKGROUND

The present invention pertains to a method and a device, as well as a sensor, for measuring a signal transmission channel from a transmitter to a sensor via a transmission path.

A transmission channel from a transmitter to a sensor needs to be determined in many fields of application. For example, it may be required to determine the distance of a reference object from other objects. In this case, for example, the amplitude attenuation of a light signal caused by the distance can be used in the form of $1/r^4$ for distance measurements.

In many known compensation methods, the actual transmission signal is superimposed with a compensation signal at the sensor in such a manner that the sensor in total receives a nearly constant signal. Examples include:
DE10001955A1;
DE10024156A1;
DE19839730C1;
DE9309837U1;
DE10001943C1;
DE10346741B3;
DE102004025345B3;
DE102005013352A1;
DE102005010745B3; and
DE102007005187B4.

All these methods have the following common features:
the compensation signal and/or the transmission signal is an amplitude-controlled analog signal;
the transmission signal has a constant duty factor and/or is essentially monofrequent.

The analog compensation signal is the significant disadvantage of all these methods. It requires an adjustable amplifier or, in other words, an analog multiplier that usually cannot be manufactured in a temperature-stable manner without substantial effort. Such a system is difficult to produce. It particularly requires very complex analog in-production inspections.

SUMMARY

This disclosure teaches a purely digital activation of the transmitter and/or the compensation transmitter and thus reduces the aforementioned problems.

The inventive method for measuring the transmission characteristics of at least a first transmission path comprises at least a first transmitter that sends at least one signal into said first transmission path. The signal is detected in at least a first receiver after it passes through at least a section of said first transmission path. In said receiver, the signal is superimposed in an additive manner with at least a second signal of a second transmitter from at least one transmission path that with respect to its characteristics is essentially known or is predetermined or can be predetermined. The method is characterized in that a transmission signal is at least intermittently distributed between at least said first transmitter and said second transmitter in a controlled manner. This switching allows a distribution of the transmission signal between the first transmitter and the second transmitter that preferably consists of a compensation transmitter. The distribution of the transmission signal may be realized in a continuously variable manner between 0% and 100%. This means that any desired distributions are possible. The switching preferably is a (controlled) switching, during which the distribution is realized in such a manner that the transmission signal is adjusted to 100% for the first transmitter while it is adjusted to 0% for the second transmitter and vice versa. The transmission signal preferably is at least intermittently switched between the two transmitters in a time-dependent or in a phase-dependent controlled manner. The control is preferably realized in such a manner that, referred to the signal received by the receiver, the first signal component averaged over a predefined time period, which is to be assigned to the first transmitter, essentially is exactly as large as the second signal component averaged over the predefined time period, which is to be assigned to said second transmitter.

According to the method, the deviation of the first signal component averaged over the predefined time period from the second signal component averaged over said predefined time period is—referred to the signal received by the receiver (referred to as receiver signal or receiver output signal)—at least intermittently used as control signal for the distribution, particularly for the controlled switching of the transmission signal between at least the first transmitter and the second transmitter.

The transmission signals for the first transmitter and the second transmitter may consist of unmodulated or modulated signals. When using modulated signals such as, for example, frequency-modulated or amplitude-modulated signals, an optional filter or demodulator is provided in the circuit of the sensor and preferably demodulates the receiver output signal directly or after its amplification by means of an amplifier. However, the demodulation may optionally also be carried out later during the processing of the receiver signal.

In the context of this disclosure, it was recognized that a change of the modulation and of the overall design of the system are required in order to realize a purely digital activation of the transmitter or transmitters.

According to this disclosure, the method is utilized in a sensor or a device for measuring the transmission characteristics of a transmission path. According to this disclosure, the sensor comprises a control circuit. The control circuit includes a signal generator, a first and a second multiplier, an integrator and a comparator. This control circuit is preferably realized in the form of a digital logical unit or finite-state machine or in the form of a data processing system, wherein the data processing system comprises at least a memory and a central processing unit (central unit, CPU). With respect to the digitizing of the control circuit, the drivers for the first and the second transmitter are also designed in the form of digital-to-analog converters. It is preferred to utilize a single bit digital-to-analog converter (DAC). It is likewise preferred to alternatively utilize a multiple bit DAC. The receiver amplifier of the inventive sensor consists of an analog-to-digital converter (ADC, analog-digital converter) that converts the receiver signal of the receiver into a digital signal that is then additionally processed in the digital control circuit.

Consequently, a conversion of the digital signals into analog signals does not take place until they are delivered to the transmitters. The analog receiver signal of the receiver that may be designed, for example, in the form of a photodiode if the transmitters consist of LEDs is digitized directly behind the receiver. The processing takes place digitally.

The purely digital activation of the compensation transmitter has the advantage that it can on the one hand be tested much easier, e.g., with the aid of a "scan-path"- and on the other hand usually realized with a smaller chip surface than a comparable analog solution corresponding to the prior art.

The first transmission path is the transmission path (link) to be monitored, e.g., the space in front of a vehicle. If the transmission characteristics of the transmission path including objects positioned in the transmission path between the transmitter and the receiver are known, the position of the detected objects is also known. In this manner, an object detection can be designed. At least the respective distance of the transmitter or the receiver from the object can be detected. If so required, several first transmitters need to be used in order to detect the position in space, the motion and/or the speed of the objects. Several receivers may alternatively also be used.

The transmitter referred to as second transmitter is a comparison or compensation transmitter that serves for making the device and the method at least as much as possible independent of interfering influences. The second transmitter sends a signal directly to the receiver via a second transmission path that differs from the first transmission path. The characteristics of the second transmission path are known or can be predetermined.

According to this disclosure, the first and the second transmitter are activated in a controlled manner by means of a control signal. In this case, a controlled switching of the transmission signal between the two transmitters is designed, preferably by means of a switch.

According to this disclosure, the above-described sensor, which preferably is largely realized digitally, can be used in a device for measuring the transmission characteristics of a transmission path. The sensor has a sensor output, at which a switching signal used for switching over the transmission signal between the first and the second transmitter is delivered to a processing unit. A device of this type can be used, for example, in a motor vehicle in order to detect objects in the vicinity of the motor vehicle. The device may consist, for example, of a parking aid or a distance meter.

Of course, these teachings are not limited to optical signals, in which case the transmitters are designed in the form of LEDs and the receiver is designed in the form of a photodiode. The transmitters may also consist of coils, capacitors, capacitive plates, antennas or other control means in order to emit the corresponding flows including fluidic material flows. In this case, the receiver is realized accordingly, for example, in the form of a photodiode, a coil, an antenna or the like.

In addition to processing visible or invisible light signals such as, for example, infrared radiation, it is also possible to use acoustic signals, i.e., sound waves in the audible or inaudible range. The circuit of the sensor needs to be adapted accordingly in this case. For example, the transmitters are replaced with loudspeakers and the receiver is replaced with a microphone. It is possible to utilize a modulated carrier frequency, in particular, when using sound waves, as well as when using optical signals. With respect to the processing of modulated signals, an optional demodulator also needs to be arranged in the sensor in order to demodulate the signal prior to its further processing.

The use of optical signals or ultrasonic signals is particularly advantageous if the sensor is utilized in a vehicle. The transmission characteristics of a transmission path are also measured in this case. In this manner, objects in the vicinity of the vehicle can be detected. The method can be utilized, for example, as a distance radar with a signal in the form of optical radiation (radar radiation) or as a parking aid when ultrasound (acoustic signal) or infrared radiation is used. A processing unit in the vehicle is preferably supplied with the switching signal of the sensor.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The following description merely refers to an exemplary embodiment. Prior to describing the embodiment in greater detail, it should therefore be noted that it is not limited to the respective circuit components or the respective procedural steps because these components and steps can vary. Essential parts of the method may alternatively be realized, in particular, in the form of software or a digital logical unit, as described below. The terms used in this description are merely intended for describing special embodiments and should not be interpreted in a restrictive sense. Whenever the singular or indefinite articles are used in the description and in the claims, this also refers to a plurality of these elements as long as the overall context does not clearly indicate otherwise.

Figure 1:
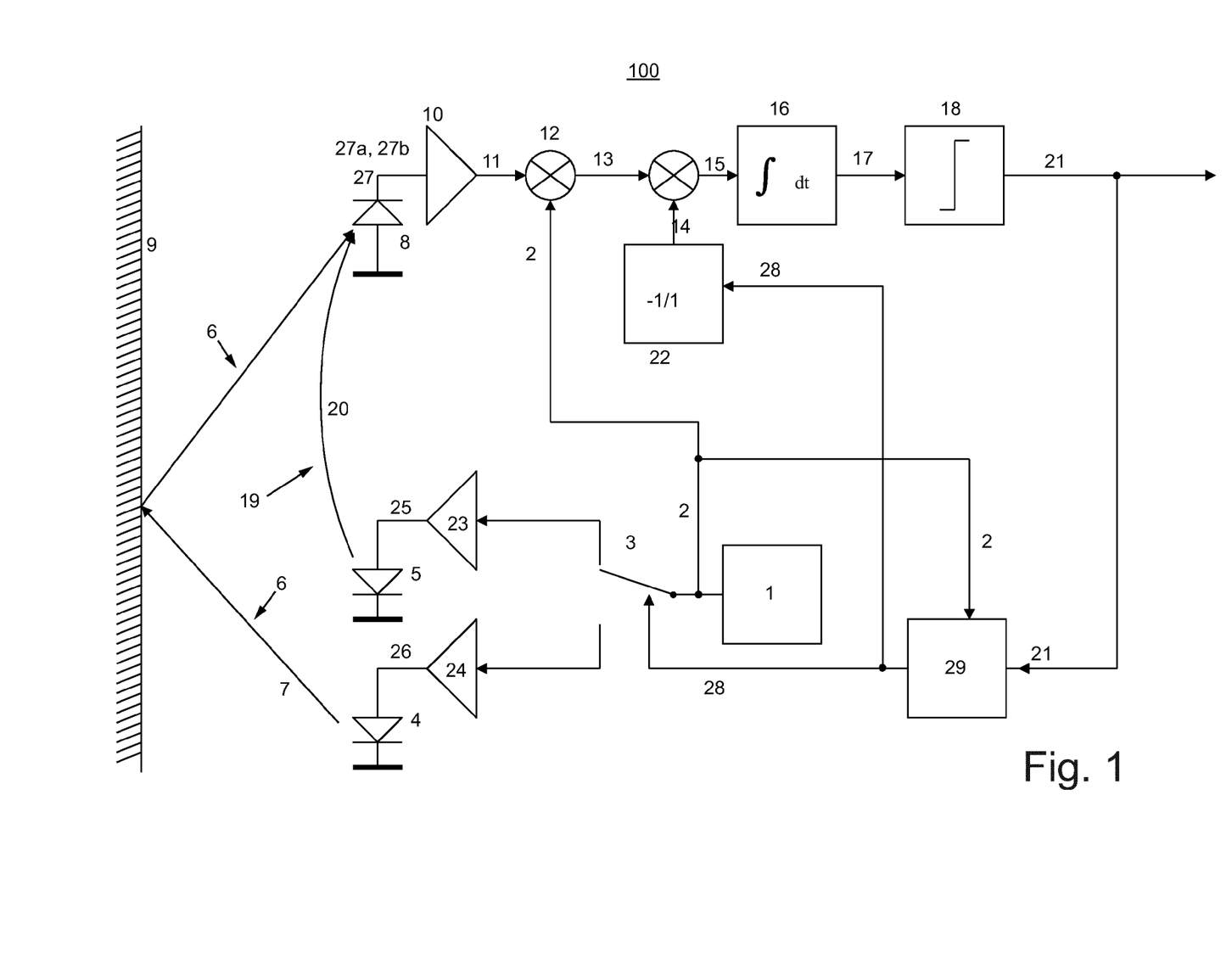
FIG. 1 shows a block diagram of a device for carrying out the method.
Figure 2:
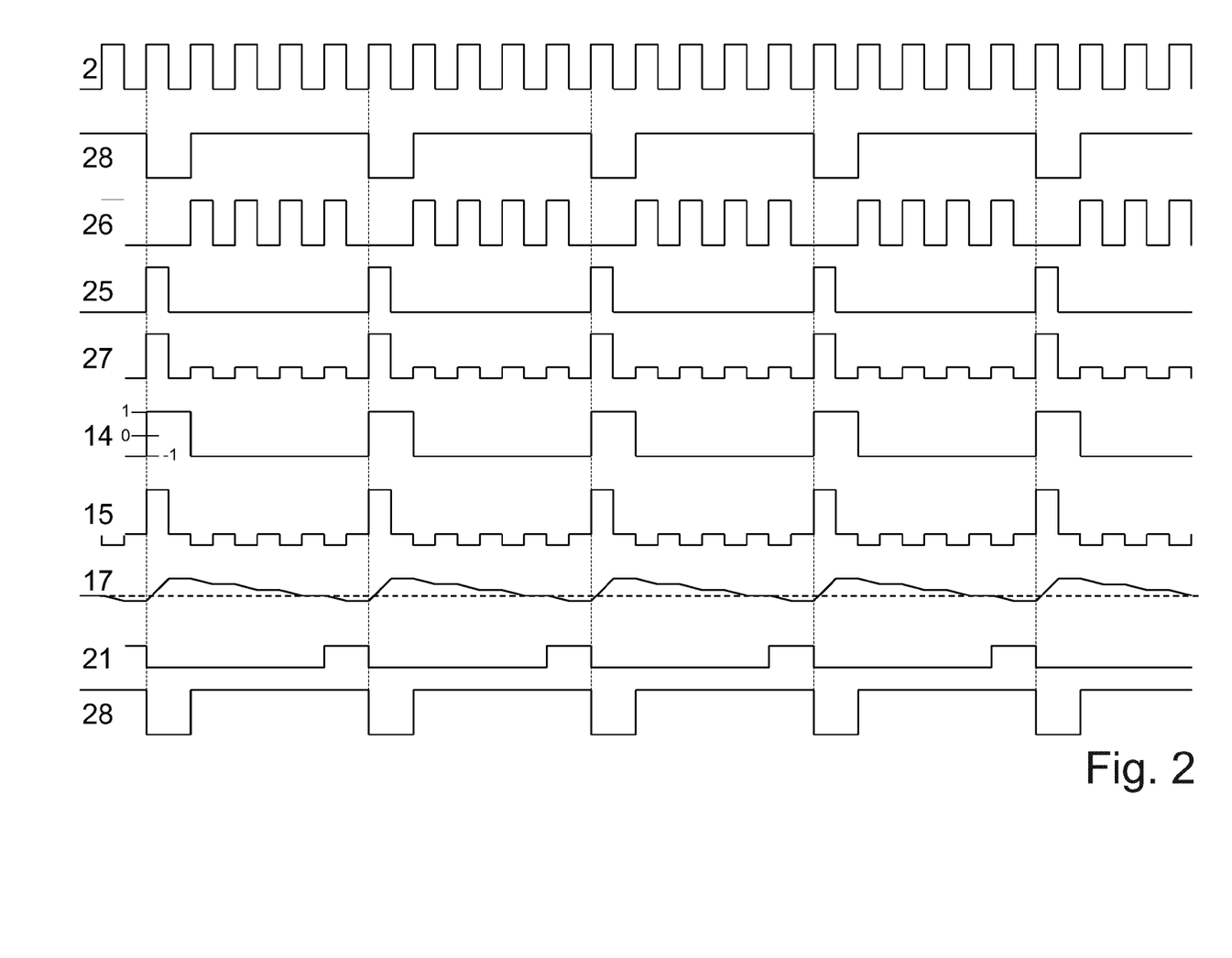
FIG. 2 shows an exemplary timing of the signals in FIG. 1.

The disclosed embodiment is initially explained with reference to FIGS. 1 (block diagram) and 2 (signal diagram).

An inventive sensor 100 comprises a signal generator 1 that generates a signal 2, typically a clock signal. Depending on the position of the switch 3, this signal 2 is routed to a transmitter 4 in the form of a transmitter input signal 26 via a driver component realized in the form of an amplifier 24 or to a compensation transmitter 5 in the form of a compensator input signal 25 via a driver component realized in the form of the amplifier 23. In this example, the respective transmitters consist of a transmission LED 4 and a compensation transmission LED 5. Instead of such an optical system that is based on LEDs and photodiodes and described in greater detail below, it would also be conceivable, for example, to utilize other systems that are based on inductively transmitted signals and in which the transmitters and receivers consist of coils or are based on capacitive signals and in which capacitor plates are used as transmitters and receivers or are based on inductively transmitted signals with transmitters in the form of coils and receivers in the form of Hall plates or are based on electromagnetic waves and in which antennas are used as transmitters and receivers; or are based on sound waves with transmitters in the form of loudspeakers and receivers in the form of microphones; or are based on modifiable material flows, for example, in tubes, flowing liquids or gases or other fluids, wherein the transmitters consist, for example, of reagent injectors and the receivers consist, for example, of sensors such as, in particular, colorimetric sensors or chromometers; or are based on another modifiable or modulation-capable energy flux and/or impulse current with corresponding transmitters and receivers.

All of these systems utilize the same basic principle described below.

The transmitter 4 sends a signal 7 into a transmission path 6 and said signal is received by a receiver 8 after it passes through the transmission path 6. In this case, the signal 7 can be modified by the transmission path 6. This can occur, for example, due to objects 9, on which the signal 7 is reflected before it reaches the receiver 8.

A signal 27 of the receiver 8 is based on the received signal 7. The signal 27 is amplified in an amplifier 10 and, if applicable, impedance-converted. The output signal 11 of the amplifier 10 is multiplied by the signal generator signal 2 of the signal generator 1 in a multiplier 12 in order to obtain a new signal 13.

Depending on the digital sign signal 14 that is generated in a sign generator 22 in dependence on a switching signal 28, this signal 13 is respectively multiplied by −1 or +1 in order to obtain the signal 15. This respectively results in an up-integration or down-integration of the signal 13 in the downstream integrator or decimation filter 16. Its analog output signal 17 is converted into the digital sign signal 21 by a comparator 18. This digital sign signal 21 is delayed by one clock cycle of the signal 2 by means of a delay circuit 29 in order to obtain the switching signal 28. Based on the switching signal 28, it is determined if the transmitter 4 is connected to the signal generator 1 and the signal 2, i.e., if it transmits, or if the compensation transmitter 5 is connected to the signal generator 1 and the signal 2.

Consequently, the sign signal 21 is decisive for the position of the switch 3 during the next clock cycle of the signal 2. This method essentially corresponds to a superimposed pulse-width modulation (PWM modulation) of the signal 2, wherein the PWM modulation for generating the signal 26 for the first transmitter 4 takes place inverse to the PWM modulation for generating the signal 25 for the compensation transmitter 5.

The compensation transmitter 5 itself sends a signal 19 into another transmission path 20 that also ends at the receiver 8. The signals 7, 19 of the first transmission path 6 and the second transmission path 20 are added up at the receiver. The signal 27 is formed of the two signals 7, 19 at the output of the receiver 8.

In contrast to the well-known evaluation of a so-called "optical bridge" in accordance with the Halios method that is described, for example, in DE 10 2007 005 187 and in which the composite signal 27 (alternating component) passed through the two transmission paths 6, 20 is adjusted to zero in the receiver, the time average of the two signal components 27a, 27b (via the transmission paths 6, 20) is adjusted to zero at the receiver 8 in this case. The signal component 27a is based on the signal 7 of the first transmitter 4 and the signal component 27b is based on the signal 19 of the second transmitter 5.

During slow interferences in comparison with the clock frequency of the signal generator 1, e.g., during a change of extraneous light when LEDs are used—this does not represent a considerable disadvantage. The utilization of a Delta-Sigma method makes it possible to eliminate the controlled power sources required in conventional circuits, for example, for activating the transmission LEDs 4, 5 in case LEDs are used. The (digital) bit stream at the output 21 is essentially identical to the sign signal 14. It merely leads by one clock cycle and is inverted. It represents the disbalance of the two signal transmission paths 6, 20, i.e., the deviation between the signal components 27a, 27b. Depending on the respective application, the resolution is ensured with a corresponding decimation filter 16.

Figure 3:
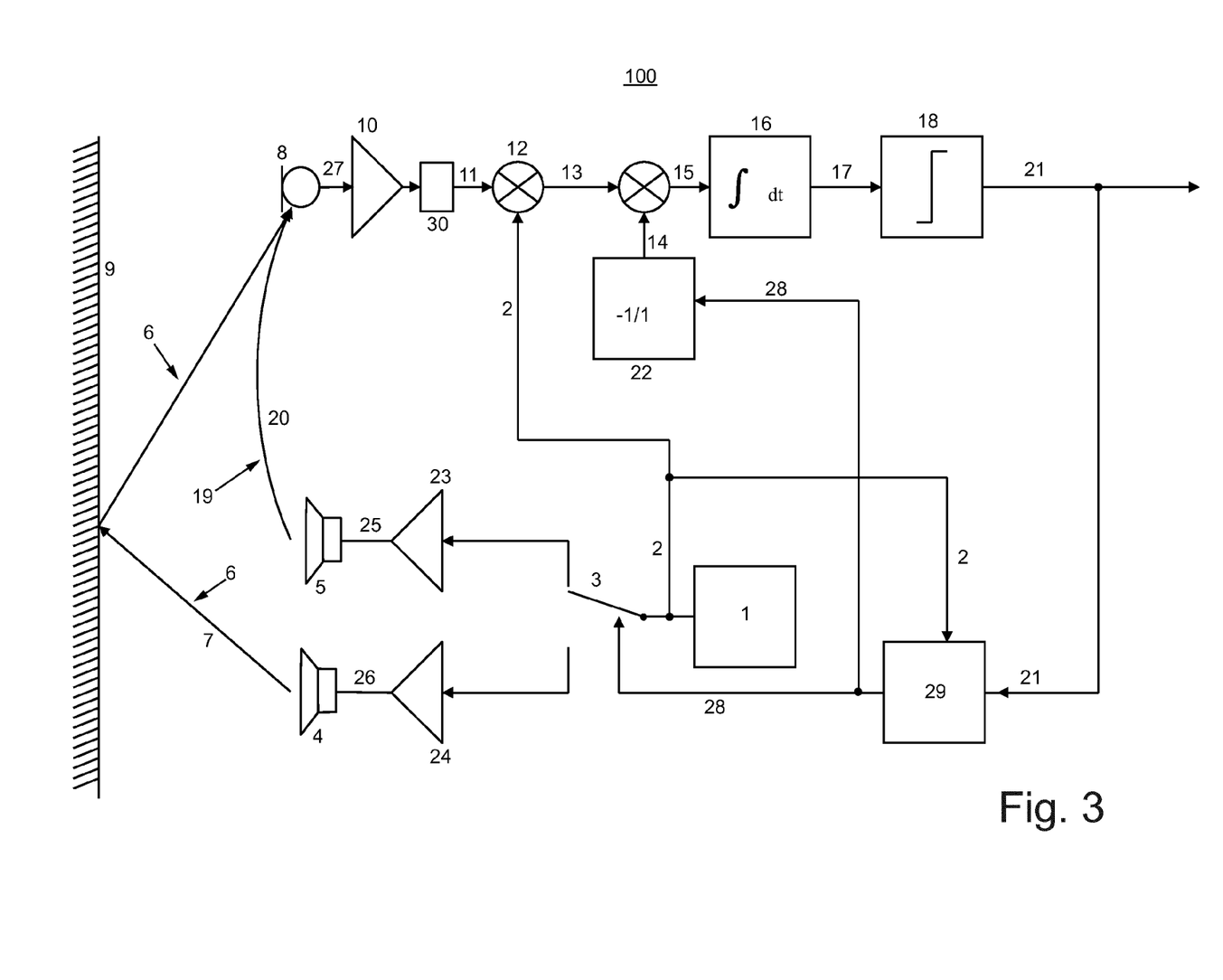
FIG. 3 shows a block diagram of a device (sensor) for carrying out the method with acoustic signals.

FIG. 3 shows a special embodiment of the inventive sensor 100. Acoustic signals 7, 19 are used in this sensor 100. The transmitter 4 and the compensation transmitter 5 are therefore realized in the form of loudspeakers. The receiver 8 consists of a microphone. The signals 7, 19 consist of sound waves or ultrasonic waves that are processed by the sensor 100. The transmitters 4, 5 and the receiver 8 need to be respectively adapted to the sound waves used. When using ultrasonic waves, it is possible, for example, to utilize dynamic and electrostatic loudspeakers or, in particular, piezoelectric loudspeakers or piezoelectric quartz or ceramic oscillators.

Figure 4:
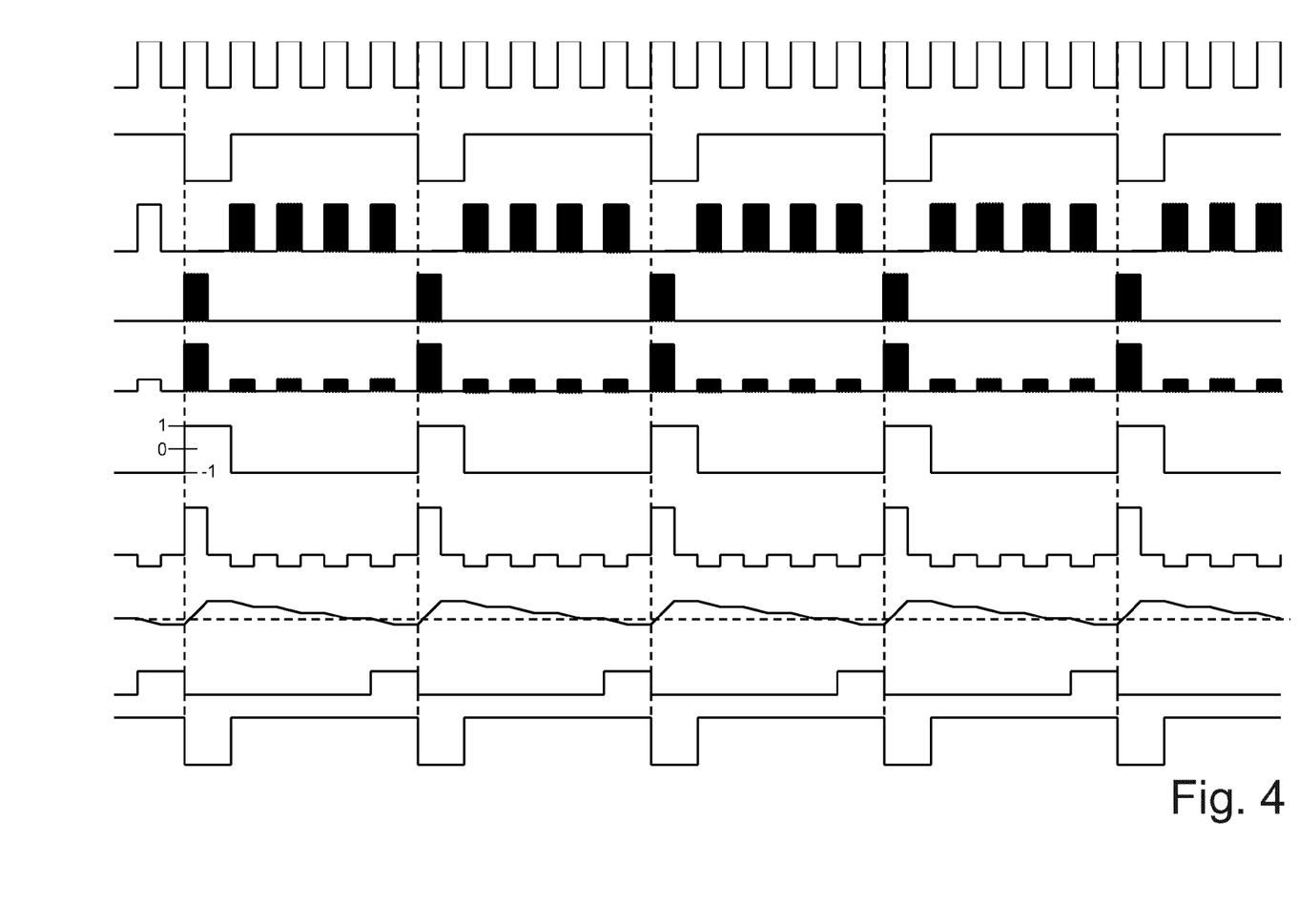
FIG. 4 shows an exemplary timing of the signals in FIG. 1 when using modulated carrier frequency signals in accordance with FIG. 2.

When sound waves are used, the loudspeakers 4, 5 can also emit modulated carrier frequencies. A filter or a demodulator 30 needs to be provided downstream of the receiver 8 in order to further process these signals in the sensor 100. The optional demodulator 30 is preferably arranged between the amplifier 10 and the multiplying element 12. The use of demodulated signals is illustrated in FIG. 4. This figure shows that the signals 25, 26 and 27 are modulated signals. Due to the utilization of the filter 30, the other signals in the processing remain unchanged in comparison with the signals illustrated in FIG. 2.

As already mentioned, this method may also be realized in the form of software, for example, by utilizing a microcomputer platform, particularly a digital signal processor platform (DSP platform). This is explained briefly and sufficiently for a person skilled in the art below with reference to FIG. 5.

Figure 5:
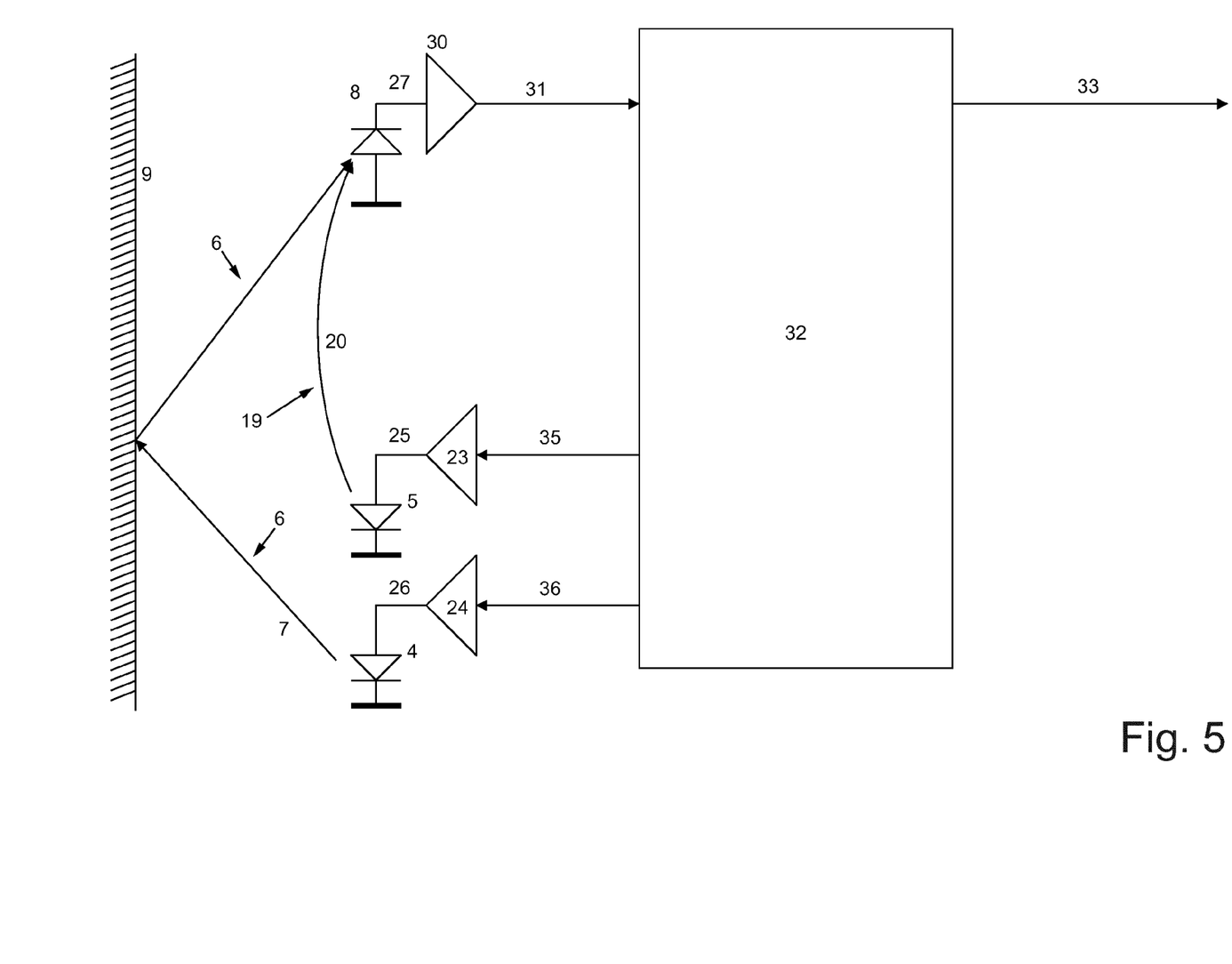
FIG. 5 shows a block diagram of an implementation in the form of a microprocessor system.

The signal 27 of the receiver 8 is converted into a purely digital signal 31 that is fed to a digital processing unit 32 by means of an analog-to-digital converter (ADC) 30. In this context, it is important that the ADC 30 may also consist of a single bit or a multiple bit ADC. Whenever the term digital processing unit 32 is used in this context, it refers to its functionality essentially being based on Boolean functions. Depending on the respective intended use, a person skilled in the art will typically realize this digital processing unit 32, for example, in the form of a DSP platform, a microcomputer platform or digital logical unit, etc. It is usually sensible that this digital processing unit 32 has at least two digital or analog output signals 35, 36, by means of which the driver components (amplifiers) 24, 23 of the transmitters 4, 5 are activated. It is self-evident that, depending on the viewpoint, the drivers 24, 23 may also be considered as part of the digital processing unit 32 if they also deliver digital output signals 26, 25. With respect to their function, however, the drivers 24, 23 may also consist of digital-to-analog converters 24, 23 (D/A converters) that not only switch the signals 26, 25 on or off, but also output these signals such that their amplitude corresponds to the predefined and in this case digital signals 35, 36 (FIG. 5).

It is furthermore sensible that the digital processing unit 32 is capable of communicating with a master system and of exchanging the determined data in suitable form, particularly in digital or analog form, via an interface 33 that is realized in digital or analog manner or in accordance with a more complex standard or protocol depending on the respective intended use. The circuit illustrated in FIG. 5 may represent, e.g., a proximity sensor of a motor vehicle whereas the master system forms a part of the motor vehicle electronics that respectively carries out the activation, evaluation and display of the signals and their further processing.

Figure 6:
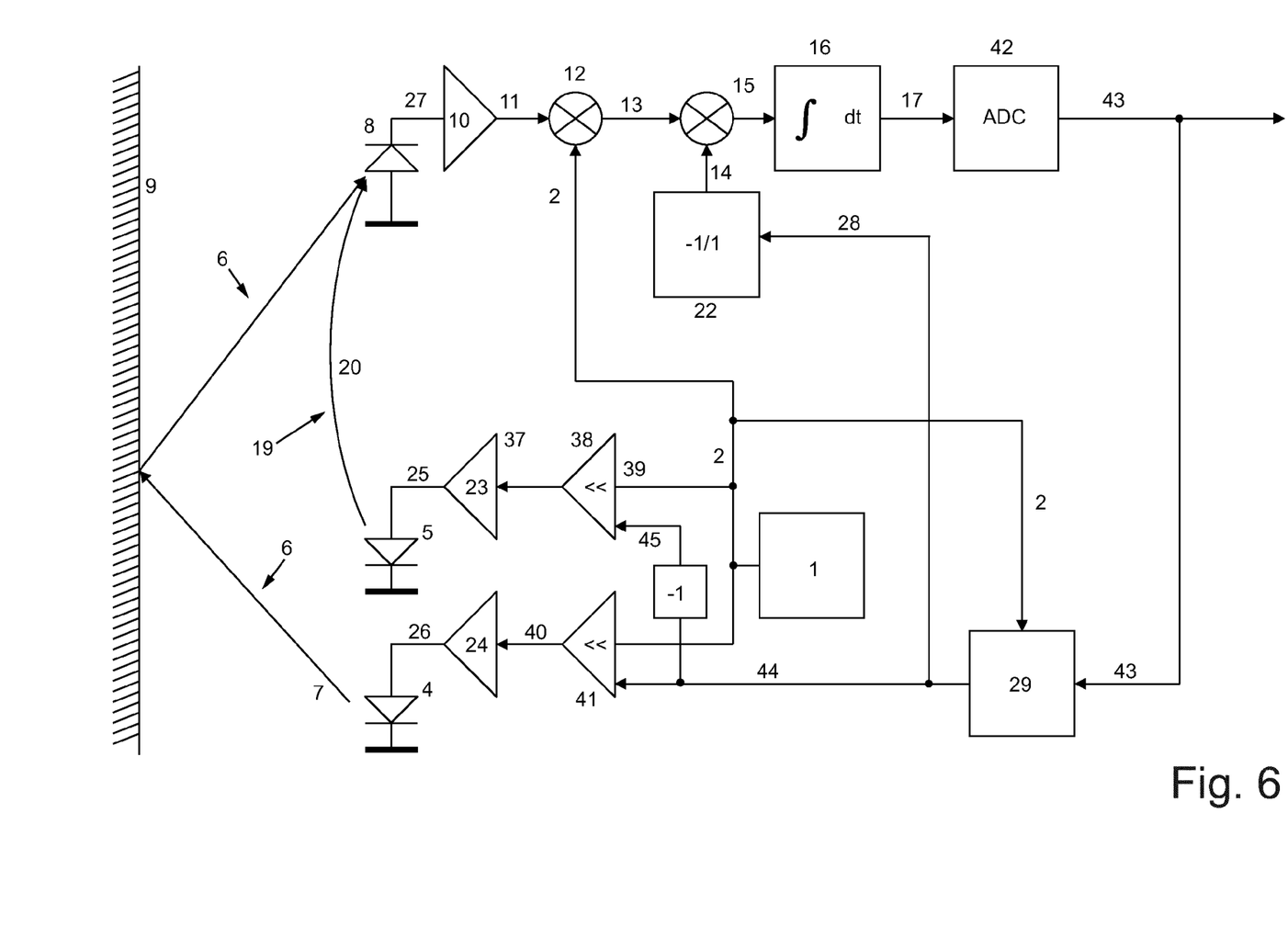
FIG. 6 shows a block diagram of a simultaneous amplitude control and PWM control.

In certain instances, a system of the type described with reference to FIGS. 1 and 2 will require a higher resolution than that achieved with the above-described complementary PWM modulation of the signals 26 and 25. It may therefore be sensible to utilize an expanded circuit according to FIG. 6, in which an analog/digital converter (ADC) 42 converts the integrator signal 17 into a digital value 43. This digital value is once again delayed by one clock cycle in a delay unit 29 and after corresponding adaptation 39, 44, 45 respectively the digital value controls an adjustable amplifier 38, 41 in such a manner that the signal 2 is not only switched, but an amplitude control is also realized. Consequently, the signal 37 for the compensation transmitter 5, as well as the signal 40 for the transmitter 4, is controlled with respect to its amplitude. Although this means that the advantage of realizing the system in digital technology as far as possible is lost, the overall resolution is increased in comparison with the prior art.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method for measuring the transmission characteristics of a first transmission path between a first transmitter and a receiver, the method comprising:
   the first transmitter sending a first signal into the first transmission path, the first signal being detected by the receiver after it passes through the first transmission path;
   a second transmitter sending a second signal into a second transmission path that can be predetermined; and
   the second signal is received in the receiver after it passes through the second transmission path and is superimposed with the first signal;
   a transmission signal is at least intermittently distributed between the first transmitter and the second transmitter in a controlled manner;
   a receiver signal received by the receiver comprises first and second signal components to be assigned to the first and second transmitters, respectively, wherein the first signal component averaged over a predefined time period is exactly as large as the second signal component averaged over said time period; and
   the deviation of the first signal component averaged over said predefined time period from the second signal component averaged over said predefined time period is at least intermittently used as a control signal for the distribution of the transmission signal between the first transmitter and the second transmitter, whereby the first transmitter and/or the second transmitter can be digitally activated.

2. The method according to claim 1, wherein controlled switching between the first transmitter and the second transmitter takes place in an at least intermittently time-dependent or phase-dependent manner and/or controlled switching of the transmission signal between the first transmitter and the second transmitter is carried out.

3. The method according to claim 1, wherein said transmission signal is at least intermittently distributed between said first transmitter and said second transmitter in an amplitude-controlled manner.

4. The method according to claim 1, wherein a switching signal used for switching between a first transmitter and a second transmitter is multiplied by the amplified or non-amplified and/or by the modulated or unmodulated receiver signal after multiplication by a constant.

5. The method according to claim 1, wherein at least one of the transmission signals used for activating the first transmitter and the second transmitter is multiplied by the amplified or non-amplified and/or by the modulated or unmodulated receiver signal.

6. The method according to claim 1, wherein the receiver signal of the receiver is integrated after multiplication by the switching signal with the correct sign and by the transmission signal.

7. The method according to claim 1, wherein, after filtering and/or at least one multiplication, the receiver signal is fed to a comparator that converts the signal into a digital signal.

8. The method according to claim 1, wherein the bit stream generated by a comparator represents a measure for characteristics of the transmission path from at least the first transmitter to at least the receiver and/or a measure for characteristics of objects that are functionally correlated to the transmission path or form part thereof.

9. The method according to claim 1, wherein a digital transmission signal is generated.

10. The method according to claim 1, wherein the transmitters emit an acoustic signal and the receiver receives the acoustic signal.

11. The method according to claim 1, wherein at least one pair of the transmitters emits a magnetic flux or an electrostatic or electrodynamic field or a light flux or modulates the characteristics of a corresponding material flow or matter flow that is respectively received or analyzed by the receiver.

12. A sensor for measuring the transmission characteristics of a first transmission path, comprising:
   a first transmitter that feeds a first signal into the first transmission path;
   a second transmitter that feeds a second signal into a second transmission path that can be predetermined;
   a receiver for receiving the first signal and the second signal;
   a receiver amplifier for processing the receiver signal of the receiver;
   a first driver for activating the first transmitter;
   a second driver for activating the second transmitter, wherein the first driver and the second driver can be configured as one component; and
   a control circuit, comprising:

a signal generator and a switch configured to route a transmission signal generated by the signal generator to the first transmitter or the second transmitter in a switched manner;

a first multiplier configured to multiply the amplified receiver signal by the transmission signal;

a second multiplier configured to multiply the processed receiver signal by a signed switching signal;

an integrator configured to up-integrate or down-integrate the processed receiver signal; and a comparator for digitizing the processed and integrated receiver signal, wherein, after being delayed by means of a delay circuit, the output signal of the comparator defines the position of the switch, whereby the first transmitter and/or the second transmitter can be digitally activated.

13. The sensor according to claim 12, wherein:
the first and/or second driver comprises a digital-to-analog converter (DAC);
the receiver amplifier consists of an analog-to-digital converter (ADC) that converts the receiver signal into a digital signal; and
the control circuit is configured as a digital logical unit, a finite-state machine (FSM), or a digital computer system with at least one memory and a central processing unit.

14. The sensor according to claim 12, wherein:
the first transmission path is not predetermined; and/or
the first driver comprises an amplifier; and/or
the second driver comprises an amplifier, wherein the first driver and the second driver are configured as one component.

15. The sensor according to claim 12, wherein the sensor is configured for carrying out the following steps:
the first transmitter sending the first signal into the first transmission path, the first signal being detected by the receiver after it passes through the first transmission path;

the second transmitter sending the second signal into the second transmission path;
the second signal is received in the receiver after it passes through the second transmission path and is superimposed with the first signal;
the transmission signal is at least intermittently distributed between the first transmitter and the second transmitter in a controlled manner;
the receiver signal received by the receiver comprises first and second signal components to be assigned to the first and second transmitters, respectively, wherein the first signal component averaged over a predefined time period is exactly as large as the second signal component averaged over said time period; and
the deviation of the first signal component averaged over said predefined time period from the second signal component averaged over said predefined time period is at least intermittently used as a control signal for the distribution of the transmission signal between the first transmitter and the second transmitter.

16. The sensor according to claim 12, wherein the first transmitter and the second transmitter respectively consist of an LED or a lamp or respectively consist of a coil or an antenna or a capacitive plate, and wherein the receiver comprises a photodiode, a coil, an antenna or a capacitive plate.

17. The sensor according to claim 12, wherein the first transmitter and the second transmitter are loudspeakers and the receiver is a microphone.

18. A device for measuring the transmission characteristics of a first transmission path comprising a sensor according to claim 12, wherein the switching signal of the sensor is delivered to a processing unit.

19. The device according to claim 18, wherein the device is configured for use in a motor vehicle to detect objects in the vicinity of the motor vehicle.

* * * * *